United States Patent
Bigbee, Jr. et al.

(10) Patent No.: US 10,418,156 B1
(45) Date of Patent: *Sep. 17, 2019

(54) METHOD OF MANUFACTURE OF ELECTRICAL WIRE AND CABLE HAVING A REDUCED COEFFICIENT OF FRICTION AND REQUIRED PULLING FORCE

(71) Applicant: Encore Wire Corporation, McKinney, TX (US)

(72) Inventors: William T. Bigbee, Jr., Melissa, TX (US); Stephen S. Griffin, McKinney, TX (US)

(73) Assignee: ENCORE WIRE CORPORATION, McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,591

(22) Filed: Sep. 7, 2018

Related U.S. Application Data

(63) Continuation of application No. 15/141,352, filed on Apr. 28, 2016, now Pat. No. 10,102,947, which is a
(Continued)

(51) Int. Cl.
*H05K 1/11* (2006.01)
*H01B 13/14* (2006.01)
(Continued)

(52) U.S. Cl.
CPC .......... *H01B 13/14* (2013.01); *B29C 48/022* (2019.02); *B29C 48/154* (2019.02); *B29C 48/21* (2019.02);
(Continued)

(58) Field of Classification Search
CPC ...................................... H05K 1/11
(Continued)

(56) References Cited

U.S. PATENT DOCUMENTS 2,276,437 A 3/1942 Vaala
2,685,707 A 8/1954 Llewellyn et al.
(Continued)

FOREIGN PATENT DOCUMENTS

CA 2726607 A1 12/2009
CN 202917210 U 5/2013
(Continued)

OTHER PUBLICATIONS

American Polywater Corporation, "Laboratory Report—American Polywater Spurt Spray Lubricant Test Compared to Polywater J and NN", Aug. 9, 2005, 6 pages.
(Continued)

*Primary Examiner* — Stanley Tso
(74) *Attorney, Agent, or Firm* — Warren Rhoades LLP

(57) ABSTRACT

A process for manufacturing finished wire and cable having reduced coefficient of friction and pulling force during installation, includes providing a payoff reel containing at least one internal conductor wire; supplying the at least one internal conductor wire from the reel to at least one extruder; providing the least one extruder, wherein the at least one extruder applies an insulating material and a polymerized jacket composition over the at least one internal conductor wire, wherein the polymerized jacket composition comprises a predetermined amount by weight of nylon; and at least 3% by weight of a silica providing a cooling device for lowering the temperature of the extruded insulating material and the polymerized jacket composition and cooling the insulating material and the polymerized jacket composition in the cooling device; and, reeling onto a storage reel the finished, cooled, wire and cable for storage and distribution.

20 Claims, 2 Drawing Sheets

Related U.S. Application Data continuation of application No. 13/766,348, filed on Feb. 13, 2013, now Pat. No. 9,352,371.

(60) Provisional application No. 61/597,907, filed on Feb. 13, 2012.

(51) Int. Cl.

| | | |
|---|---|---|
| *H01B 13/00* | (2006.01) | |
| *H01B 7/18* | (2006.01) | |
| *H01B 7/02* | (2006.01) | |
| *B29C 48/21* | (2019.01) | |
| *B29C 48/00* | (2019.01) | |
| *B29C 48/28* | (2019.01) | |
| *B29C 48/154* | (2019.01) | |
| *B29C 48/88* | (2019.01) | |
| *B29L 31/34* | (2006.01) | |
| *B29K 509/02* | (2006.01) | |
| *B29K 105/00* | (2006.01) | |
| *B29K 105/16* | (2006.01) | |
| *B29K 105/20* | (2006.01) | |
| *B29K 77/00* | (2006.01) | |
| *B29K 27/06* | (2006.01) | |

(52) U.S. Cl.
CPC ............ *B29C 48/28* (2019.02); *B29C 48/911* (2019.02); *B29C 48/919* (2019.02); *H01B 7/02* (2013.01); *H01B 7/18* (2013.01); *H01B 13/0003* (2013.01); *B29K 2027/06* (2013.01); *B29K 2077/00* (2013.01); *B29K 2105/0005* (2013.01); *B29K 2105/16* (2013.01); *B29K 2105/20* (2013.01); *B29K 2509/02* (2013.01); *B29K 2995/0007* (2013.01); *B29K 2995/0037* (2013.01); *B29K 2995/0039* (2013.01); *B29L 2031/3406* (2013.01)

(58) Field of Classification Search
USPC .......................................................... 174/30
See application file for complete search history.

(56) References Cited

U.S. PATENT DOCUMENTS

| | | | |
|---|---|---|---|
| 2,930,838 | A | 3/1960 | Chizallet et al. |
| 3,064,073 | A | 11/1962 | Downing et al. |
| 3,108,981 | A | 10/1963 | Clark et al. |
| 3,191,005 | A | 6/1965 | Cox, II |
| 3,258,031 | A | 6/1966 | French |
| 3,333,037 | A | 7/1967 | Humphrey et al. |
| 3,378,628 | A | 4/1968 | Garner |
| 3,433,884 | A | 3/1969 | Cogelia et al. |
| 3,668,175 | A | 6/1972 | Sattler |
| 3,747,428 | A | 7/1973 | Waner et al. |
| 3,775,175 | A | 11/1973 | Merian |
| 3,822,875 | A | 7/1974 | Schmedemann |
| 3,849,221 | A | 11/1974 | Middleton |
| 3,852,875 | A | 12/1974 | McAmis et al. |
| 3,868,436 | A | 2/1975 | Ootsuji et al. |
| 3,877,142 | A | 4/1975 | Hamano et al. |
| 3,885,286 | A | 5/1975 | Hill |
| 3,936,572 | A | 2/1976 | MacKenzie, Jr. et al. |
| 4,002,797 | A | 1/1977 | Hacker et al. |
| 4,043,851 | A | 8/1977 | Holladay et al. |
| 4,057,956 | A | 11/1977 | Tolle |
| 4,099,425 | A | 7/1978 | Moore |
| 4,100,245 | A | 7/1978 | Horikawa et al. |
| 4,137,623 | A | 2/1979 | Taylor |
| 4,273,806 | A | 6/1981 | Stechler |
| 4,273,829 | A | 6/1981 | Perreault |
| 4,274,509 | A | 6/1981 | Thomson et al. |
| 4,275,096 | A | 6/1981 | Taylor |
| 4,299,256 | A | 11/1981 | Bacechowski et al. |
| 4,356,139 | A | 10/1982 | Rowland et al. |
| 4,360,492 | A | 11/1982 | Rowland et al. |
| 4,414,917 | A | 11/1983 | Bentley et al. |
| 4,416,380 | A | 11/1983 | Flum |
| 4,447,569 | A | 5/1984 | Brecker et al. |
| 4,449,290 | A | 5/1984 | Saunders et al. |
| 4,454,949 | A | 6/1984 | Flum |
| 4,461,712 | A | 7/1984 | Jonnes |
| 4,475,629 | A | 10/1984 | Jonnes |
| 4,522,733 | A | 6/1985 | Jonnes |
| 4,537,929 | A | 8/1985 | Nangrani |
| 4,547,246 | A | 10/1985 | Viriyayuthakorn et al. |
| 4,565,725 | A | 1/1986 | Spamer et al. |
| 4,568,420 | A | 2/1986 | Nonni |
| 4,569,420 | A | 2/1986 | Pickett et al. |
| 4,605,818 | A | 8/1986 | Arroyo et al. |
| 4,650,073 | A * | 3/1987 | Young ................... B65D 85/04 |
| | | | 206/389 |
| 4,673,516 | A | 6/1987 | Berry |
| 4,684,214 | A | 8/1987 | Goldmann et al. |
| 4,693,936 | A | 9/1987 | McGregor et al. |
| 4,749,059 | A | 6/1988 | Jonnes et al. |
| 4,751,261 | A | 6/1988 | Miyata et al. |
| 4,761,445 | A | 8/1988 | Chiba |
| 4,773,954 | A | 9/1988 | Starnes, Jr. |
| 4,781,847 | A | 11/1988 | Weitz |
| 4,806,425 | A | 2/1989 | Chu-Ba |
| 4,868,054 | A | 9/1989 | Kartheiser |
| 4,902,749 | A | 2/1990 | Akkapeddi et al. |
| 4,937,142 | A | 6/1990 | Ogushi et al. |
| 4,940,504 | A | 7/1990 | Starnes, Jr. |
| 4,952,021 | A | 8/1990 | Aoki et al. |
| 4,965,249 | A | 10/1990 | De With et al. |
| 5,036,121 | A | 7/1991 | Coaker et al. |
| 5,055,522 | A | 10/1991 | Ikeda et al. |
| 5,063,272 | A | 11/1991 | Sasse |
| 5,074,640 | A | 12/1991 | Hardin et al. |
| 5,106,701 | A | 4/1992 | Kurosaka et al. |
| 5,130,184 | A | 7/1992 | Ellis |
| 5,156,715 | A | 10/1992 | Starnes, Jr. |
| 5,182,784 | A | 1/1993 | Hager et al. |
| 5,190,679 | A | 3/1993 | McDonald |
| 5,213,644 | A | 5/1993 | Phillips et al. |
| 5,217,795 | A | 6/1993 | Sasse et al. |
| 5,225,635 | A | 7/1993 | Wake et al. |
| 5,227,080 | A | 7/1993 | Berry |
| 5,252,676 | A | 10/1993 | Suyama et al. |
| 5,324,588 | A | 6/1994 | Rinehart et al. |
| 5,326,638 | A | 7/1994 | Mottine, Jr. et al. |
| 5,346,383 | A | 9/1994 | Starnes, Jr. |
| 5,356,710 | A | 10/1994 | Rinehart |
| 5,383,799 | A | 1/1995 | Fladung |
| 5,416,269 | A | 5/1995 | Kemp et al. |
| 5,451,718 | A | 9/1995 | Dixon |
| 5,460,885 | A | 10/1995 | Chu-Ba |
| 5,492,760 | A | 2/1996 | Sarma et al. |
| 5,505,900 | A | 4/1996 | Suwanda et al. |
| 5,519,172 | A | 5/1996 | Spencer et al. |
| 5,561,730 | A | 10/1996 | Lochkovic et al. |
| 5,565,242 | A | 10/1996 | Buttrick, Jr. et al. |
| 5,614,288 | A | 3/1997 | Bustos |
| 5,614,482 | A | 3/1997 | Baker et al. |
| 5,654,095 | A | 8/1997 | Yin et al. |
| 5,656,371 | A | 8/1997 | Kawahigashi et al. |
| 5,660,932 | A | 8/1997 | Durston |
| 5,707,468 | A | 1/1998 | Arnold et al. |
| 5,707,770 | A | 1/1998 | Tanikawa et al. |
| 5,708,084 | A | 1/1998 | Hauenstein et al. |
| 5,733,823 | A | 3/1998 | Sugioka et al. |
| 5,735,528 | A | 4/1998 | Olsson |
| 5,741,858 | A | 4/1998 | Brann et al. |
| 5,753,861 | A | 5/1998 | Hansen et al. |
| 5,759,926 | A | 6/1998 | Pike et al. |
| 5,795,652 | A | 8/1998 | Bell et al. |
| 5,846,355 | A | 12/1998 | Spencer et al. |
| 5,852,116 | A | 12/1998 | Cree et al. |
| 5,856,405 | A | 1/1999 | Hofmann |
| 5,886,072 | A | 3/1999 | Linsky et al. |
| 5,912,436 | A | 6/1999 | Sanchez et al. |

(56) References Cited

U.S. PATENT DOCUMENTS

| | | |
|---|---|---|
| 5,925,601 A | 7/1999 | McSherry et al. |
| 5,965,263 A | 10/1999 | Tatematsu et al. |
| 5,981,008 A | 11/1999 | Hofmann |
| 6,039,024 A | 3/2000 | Carlson et al. |
| 6,054,224 A | 4/2000 | Nagai et al. |
| 6,057,018 A | 5/2000 | Schmidt |
| 6,060,162 A | 5/2000 | Yin et al. |
| 6,060,638 A | 5/2000 | Paul et al. |
| 6,063,496 A | 5/2000 | Jozokos et al. |
| 6,064,073 A | 5/2000 | Hoogenraad |
| 6,080,489 A | 6/2000 | Mehta |
| 6,101,804 A | 8/2000 | Gentry et al. |
| 6,106,741 A | 8/2000 | Heimann et al. |
| 6,114,036 A | 9/2000 | Rinehart et al. |
| 6,114,632 A | 9/2000 | Planas, Sr. et al. |
| 6,137,058 A | 10/2000 | Moe et al. |
| 6,146,699 A | 11/2000 | Bonicel et al. |
| 6,157,874 A | 12/2000 | Cooley et al. |
| 6,159,617 A | 12/2000 | Foster et al. |
| 6,160,940 A | 12/2000 | Summers et al. |
| 6,184,473 B1 | 2/2001 | Reece et al. |
| 6,188,026 B1 | 2/2001 | Cope et al. |
| 6,214,462 B1 | 4/2001 | Andre et al. |
| 6,222,132 B1 | 4/2001 | Higashiura et al. |
| 6,228,495 B1 | 5/2001 | Lupia et al. |
| 6,242,097 B1 | 6/2001 | Nishiguchi et al. |
| 6,270,849 B1 | 8/2001 | Popoola et al. |
| 6,281,431 B1 | 8/2001 | Cumley |
| 6,319,604 B1 | 11/2001 | Xu |
| 6,327,841 B1 | 12/2001 | Bertini et al. |
| 6,329,055 B1 | 12/2001 | Higashiura et al. |
| 6,347,561 B2 | 2/2002 | Uneme et al. |
| 6,359,231 B2 | 3/2002 | Reece et al. |
| 6,395,989 B2 | 5/2002 | Lecoeuvre et al. |
| 6,416,813 B1 | 7/2002 | Valls Prats |
| 6,418,704 B2 | 7/2002 | Bertini et al. |
| 6,424,768 B1 | 7/2002 | Booth et al. |
| 6,430,913 B1 | 8/2002 | Gentry et al. |
| 6,437,249 B1 | 8/2002 | Higashiura et al. |
| 6,461,730 B1 | 10/2002 | Bachmann et al. |
| 6,474,057 B2 | 11/2002 | Bertini et al. |
| 6,495,756 B1 | 12/2002 | Burke et al. |
| 6,530,205 B1 | 3/2003 | Gentry et al. |
| 6,534,717 B2 | 3/2003 | Suzuki et al. |
| 6,565,242 B2 | 5/2003 | Dai |
| 6,596,945 B1 | 7/2003 | Hughey et al. |
| 6,640,533 B2 | 11/2003 | Bertini et al. |
| 6,646,205 B2 | 11/2003 | Hase et al. |
| 6,728,206 B1 | 4/2004 | Carlson |
| 6,734,361 B2 | 5/2004 | Mesaki et al. |
| 6,766,091 B2 | 7/2004 | Beuth et al. |
| 6,810,188 B1 | 10/2004 | Suzuki et al. |
| 6,850,681 B2 | 2/2005 | Lepont et al. |
| 6,903,264 B2 | 6/2005 | Watanabe et al. |
| 6,906,258 B2 | 6/2005 | Hirai et al. |
| 6,912,222 B1 | 6/2005 | Wheeler et al. |
| 6,977,280 B2 | 12/2005 | Lee et al. |
| 6,997,280 B2 | 2/2006 | Minoura et al. |
| 6,997,999 B2 | 2/2006 | Houston et al. |
| 6,998,536 B2 | 2/2006 | Barusseau et al. |
| 7,053,308 B2 | 5/2006 | Prats |
| 7,087,843 B2 | 8/2006 | Ishii et al. |
| 7,129,415 B1 | 10/2006 | Bates et al. |
| 7,135,524 B2 | 11/2006 | Breitscheidel et al. |
| 7,136,556 B2 | 11/2006 | Brown et al. |
| 7,144,952 B1 | 12/2006 | Court et al. |
| 7,158,707 B2 | 1/2007 | Will et al. |
| 7,208,684 B2 | 4/2007 | Fetterolf, Sr. et al. |
| 7,247,266 B2 | 7/2007 | Bolcar |
| 7,267,571 B1 | 9/2007 | Twigg et al. |
| 7,302,143 B2 | 11/2007 | Ginocchio et al. |
| 7,411,129 B2 | 8/2008 | Kummer et al. |
| 7,485,810 B2 | 2/2009 | Bates et al. |
| 7,490,144 B2 | 2/2009 | Carlson et al. |
| 7,491,889 B2 | 2/2009 | Dinkelmeyer et al. |
| 7,549,474 B2 | 6/2009 | Valenziano et al. |
| 7,555,542 B1 | 6/2009 | Ayers et al. |
| 7,557,301 B2 | 7/2009 | Kummer et al. |
| 7,642,451 B2 | 1/2010 | Bonn |
| 7,678,311 B2 | 3/2010 | Bolcar |
| 7,749,024 B2 | 7/2010 | Chambers et al. |
| 7,776,441 B2 | 8/2010 | Mhetar et al. |
| 7,934,311 B2 | 5/2011 | Varkey |
| 8,043,119 B2 | 10/2011 | Kummer et al. |
| 8,088,997 B2 | 1/2012 | Picard et al. |
| 8,382,518 B2 | 2/2013 | Chambers et al. |
| 8,616,918 B2 | 12/2013 | Chambers et al. |
| 8,658,576 B1 | 2/2014 | Bigbee, Jr. et al. |
| 8,701,277 B2 | 4/2014 | Kummer et al. |
| 2002/0002221 A1 | 1/2002 | Lee |
| 2002/0139559 A1 | 10/2002 | Valls Prats |
| 2003/0195279 A1 | 10/2003 | Shah et al. |
| 2004/0001682 A1 | 1/2004 | Beuth et al. |
| 2004/0045735 A1* | 3/2004 | Varkey .................. H01B 3/441 |
| | | 174/120 R |
| 2004/0254299 A1 | 12/2004 | Lee et al. |
| 2005/0019353 A1 | 1/2005 | Prinz et al. |
| 2005/0023029 A1 | 2/2005 | Mammeri et al. |
| 2005/0107493 A1 | 5/2005 | Amizadeh-Asl |
| 2005/0180725 A1 | 8/2005 | Carlson et al. |
| 2005/0180726 A1 | 8/2005 | Carlson et al. |
| 2006/0065428 A1 | 3/2006 | Kummer et al. |
| 2006/0065430 A1 | 3/2006 | Kummer et al. |
| 2006/0068085 A1 | 3/2006 | Reece et al. |
| 2006/0068086 A1 | 3/2006 | Reece et al. |
| 2006/0088657 A1 | 4/2006 | Reece et al. |
| 2006/0151196 A1 | 7/2006 | Kummer et al. |
| 2006/0157303 A1 | 7/2006 | Reece et al. |
| 2006/0167158 A1 | 7/2006 | Yagi et al. |
| 2006/0191621 A1 | 8/2006 | Kummer et al. |
| 2006/0249298 A1 | 11/2006 | Reece et al. |
| 2006/0249299 A1 | 11/2006 | Kummer et al. |
| 2006/0251802 A1 | 11/2006 | Kummer et al. |
| 2007/0098340 A1 | 5/2007 | Lee et al. |
| 2007/0207186 A1 | 9/2007 | Scanlon et al. |
| 2008/0066946 A1 | 3/2008 | Kummer et al. |
| 2008/0244925 A1* | 10/2008 | Shin ...................... F26B 21/004 |
| | | 34/611 |
| 2008/0268218 A1 | 10/2008 | Lee |
| 2009/0250238 A1 | 10/2009 | Picard et al. |
| 2009/0250239 A1 | 10/2009 | Picard et al. |
| 2010/0044071 A1 | 2/2010 | Murao et al. |
| 2010/0105583 A1 | 4/2010 | Garmier |
| 2010/0230134 A1 | 9/2010 | Chambers et al. |
| 2010/0236811 A1 | 9/2010 | Sasse et al. |
| 2010/0255186 A1 | 10/2010 | Montes et al. |
| 2010/0285968 A1 | 11/2010 | Gregory |
| 2011/0034357 A1 | 2/2011 | Kawata et al. |
| 2011/0144244 A1 | 6/2011 | Lee |
| 2011/0290528 A1 | 12/2011 | Honda et al. |
| 2012/0012362 A1 | 1/2012 | Kim et al. |
| 2013/0168128 A1 | 7/2013 | Lopez-Gonzalez |

FOREIGN PATENT DOCUMENTS

| | | |
|---|---|---|
| EP | 0283132 A2 | 9/1988 |
| EP | 0364717 A1 | 4/1990 |
| EP | 0544411 A1 | 6/1993 |
| EP | 1524294 A1 | 4/2005 |
| FR | 2674364 A1 | 9/1992 |
| IN | 9500996 I4 | 3/2010 |
| JP | 61133506 A | 6/1986 |
| JP | 61133507 | 6/1986 |
| JP | 01110013 | 4/1989 |
| JP | 01144504 | 6/1989 |
| JP | 01166410 A | 6/1989 |
| JP | 01307110 | 12/1989 |
| JP | 05266720 | 10/1993 |
| JP | 06057145 | 3/1994 |
| JP | 9045143 A | 2/1997 |
| JP | 09251811 | 9/1997 |
| JP | 1012051 | 1/1998 |
| JP | 1086207 A | 4/1998 |
| JP | 2001264601 A | 9/2001 |

(56) References Cited

FOREIGN PATENT DOCUMENTS

| | | | |
|---|---|---|---|
| JP | 2002231065 | | 8/2002 |
| JP | 2003323820 | | 11/2003 |
| WO | 198900763 | A1 | 1/1989 |
| WO | 1991008262 | A2 | 6/1991 |
| WO | 1995012885 | A1 | 5/1995 |
| WO | 2000040653 | A1 | 7/2000 |
| WO | 2001081969 | A1 | 11/2001 |
| WO | 2001090230 | A1 | 11/2001 |
| WO | 2002043391 | A1 | 5/2002 |
| WO | 2003086731 | A1 | 10/2003 |
| WO | 2005042226 | A1 | 5/2005 |
| WO | 2006015345 | A2 | 2/2006 |
| WO | 2006016895 | A1 | 2/2006 |
| WO | 2006016896 | A1 | 2/2006 |
| WO | 2006118702 | A2 | 11/2006 |
| WO | 2006127711 | A2 | 11/2006 |
| WO | 2007081372 | A1 | 7/2007 |
| WO | 2007084745 | A2 | 7/2007 |
| WO | 2009126613 | A1 | 10/2009 |
| WO | 2009126619 | A1 | 10/2009 |
| WO | 2010107932 | A1 | 9/2010 |
| WO | 2010113004 | A2 | 10/2010 |

OTHER PUBLICATIONS

American Polywater Corporation, "Polywater J Specification", Aug. 2010, 4 pages.
American Polywater Corporation, "Polywater Spy Cable Lubricant—Technical Specification", May 2008, 4 pages.
American Polywater Corporation, "Polywater Spy Lubricant—Technical Report", Feb. 26, 2008, 4 pages.
Axel Plastics Research Laboratories, Inc., Product Data Sheet re "Mold Wiz. INT-40DHT" (Approx. 2001) (1 p).
CSA Standards Update Service, "Thermoplastic-Insulated Wires and Cables", UL 83, Thirteenth Edition, Nov. 15, 2003, 186 pages.
Decoste, "Friction of Vinyl Chloride Plastics", SPE Journal, vol. 25, Oct. 1969, pp. 67-71.
Domininghaus, "Les Matieres plastiques les plus usuelles," Informations Chimie No. 158, pp. 179-194, 1976.
Dow Corning article "Siloxane additive minimizes friction in fibre optic cable conduit", 2000 (2 pp) (http://www.dowcorning.com).
Dow Corning Material Safety Data Sheet re Dow Corning MB50-011 composition, Mar. 4, 2008 (1 p) (http://www.dowcorning.com).
Dow Corning Material Safety Data Sheet sheet re Dow Corning MB50-320 composition, Mar. 4, 2008 (I pp) (http://www.dowcorning.com).
Dow Corning Material Safety Data Sheet: re Dow Corning MB50-008 composition, Mar. 4, 2008 (1 pp) (http://www.dowcorning.com).
Dow Corning Product Information sheet re Dow Corning MB40-006 composition. 1997-2005(1 p) (http://www.downcorning.com).
Dow Corning Product Information sheet re Dow Corning MB50-001 composition. Jan. 15, 2001 (6 pp) (http://www.dowcorning.com).
Dow Corning Product Information sheet re Dow Corning MB50-002 composition, 1997-2014 (4 pp) (http://www.dowcorning.com).
Dow Corning Product Information sheet re Dow Corning MB50-004 composition, Jan. 15, 2001 (4 pp) (http://www.dowcorning.com).
Dow Corning Product Information sheet re Dow Corning MB50-010 composition, (2pp) (http://www.dowcorning.com).
Dow Corning Product Information sheet re Dow Corning MB50-321 composition, Jan. 15, 2001 (2pp) (http://www.dowcorning.com).
Dow Corning Product information sheets re Dow Corning MB50-313 composition, Nov. 5, 2001 (4 pp) (http://www.dowcorning.com).
Dow Corning Product information sheets re Dow Corning MB50-314 composition, Nov. 5, 2001 (4 pp) (http://www.dowcorning.com).
Dow Corning, "Dow Corning MB50-011 Masterbatch Material Safety Data Sheet Information", 1997-2001.
Dow Corning, "Dow Corning MB50-011 Masterbatch Product Information", Ultra-high Molecular Weight Siloxane Polymer Dispersed in Polymide 6, 1999, pp. 1-3.
European Patent Office, "Extended Search Report for Application No. 06739714.1", dated Nov. 12, 2009.
European Patent Office, Opposition to European Patent EP 1899988 and accompanying documentation, filed Oct. 22, 2013 (23 pages).
General Electric Company, Brochure entitled "GE Silicones-Fluids, Emulsions & Specialties", (2001) (19 pp).
Ideal Industries GmbH, "Yellow 77" Document, 2003, 1 page.
Trotignon et al., "Extrusion des Thermoplastiques", in "Matieres Plastiques", Editions Nathan, 1996, p. 148.
Underwriters Laboratories, Inc., Safety for Nonmetallic-Sheathed Cables, UL 719, 12th Edition, Feb. 9, 2006, pp. 1-42.
Wild, Frank, "The Effects of Silicone Polymer Additions on the Processing and Properties of an Isotactic Propylene Homopolymer", Sep. 1995, 102 pages.
Wiles, John, "Clarifying Confusing Cables", Home Power #66, Aug./Sep. 1998.

* cited by examiner

METHOD OF MANUFACTURE OF ELECTRICAL WIRE AND CABLE HAVING A REDUCED COEFFICIENT OF FRICTION AND REQUIRED PULLING FORCE

CROSS-REFERENCE TO RELATED APPLICATIONS

This application is a continuation of U.S. patent application Ser. No. 15/141,352, filed Apr. 28, 2016, which is a continuation of U.S. patent application Ser. No. 13/766,348, filed Feb. 13, 2013, now issued as U.S. Pat. No. 9,352,371, which claims the benefit of U.S. Provisional Application Ser. No. 61/597,907, filed on Feb. 13, 2012, all of which are herein incorporated in their entirety by reference.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

This invention relates to electrical wire and cable. More specifically, it relates to a method for manufacture of electrical wire and cable having a reduced coefficient of friction and reduced pulling force to aid in the installation of same.

2. Description of Related Art

Electrical cables used in housing and industrial projects typically include an electrical conductor surrounded by at least one additional layer. In some cases, the additional layer is an insulating layer of material used to insulate the conductor. The insulator may be made of insulating materials such as polyvinyl chloride (PVC) or polyethylene (PE). The insulating layer is then surrounded by a layer of thermoplastic material, and this outermost layer may be referred to as a "sheath" or a "jacket." Installation of electrical cable requires the cable to be threaded or passed through sections of a building, such as walls, ceilings, ducts and other conduits. During installation of wires or cables, increased effort is required to pull the wires or cables through the conduit due to friction between the materials involved. This friction also may result in damage of the wire or cable during the installation process.

The most common electrical cable used in housing and industrial projects in the United States is called THHN ("Thermoplastic High Heat-resistant Nylon coated"). A typical THHN cable uses copper as an electrical conductor, polyvinyl chloride as the insulating material and nylon as the sheath material.

Currently, various methods are used to minimize the coefficient of friction on the surface of the wire or cable to reduce the amount of pulling force required making it easier to pull through conduit and other building structures during installation. Such methods have included manually applying a lubricant to the sheath at the job site just prior to installation. However, the manual application method is time consuming, labor intensive, and requires additional materials to be on the job site during cable installation. Other methods include adding a separate lubricating layer to the sheath and incorporating the lubricant into the sheath prior to forming the sheath. These methods typically require an additional sheath layer formed over the conductor core and insulating layer by an extrusion method or additional equipment to incorporate the lubricant into the sheath prior to formation.

Therefore, a need exists for a method of extruding a composition as an outer jacket onto wire and cable that reduces the coefficient of friction and effective pulling force required during installation that does not require spray on compositions or hand lubricating techniques.

BRIEF SUMMARY OF THE INVENTION

The present invention provides for an extrusion system and method to manufacture electrical wire and cable having a reduced coefficient of friction wherein the method utilizes a pelletized composition for extrusion comprising polymerized silica with nylon to reduce the pulling force during wire and cable installation. The process for making a finished wire and cable having a reduced coefficient of friction and reduced pulling force during installation, comprises providing a payoff reel containing at least one internal conductor wire; supplying the at least one internal conductor wire from the reel to at least one extruder; providing the least one extruder, wherein the least one extruder applies an insulating material and a polymerized jacket composition over the at least one internal conductor wire, wherein the polymerized jacket composition comprises a predetermined amount by weight of nylon; and at least 3% by weight of a commercially available and synthetically produced, amorphous silica that exhibits high porosity and high purity wherein the silica is polymerized with nylon (e.g., Nylon 6 or the like) and then pelletized for use; providing a cooling device for lowering the temperature of the extruded insulating material and the polymerized jacket composition and cooling the insulating material and the polymerized jacket composition in the cooling device; and, reeling onto a storage reel the finished, cooled, wire and cable for storage and distribution.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

In the drawings.

DETAILED DESCRIPTION OF THE INVENTION

Figure 1:
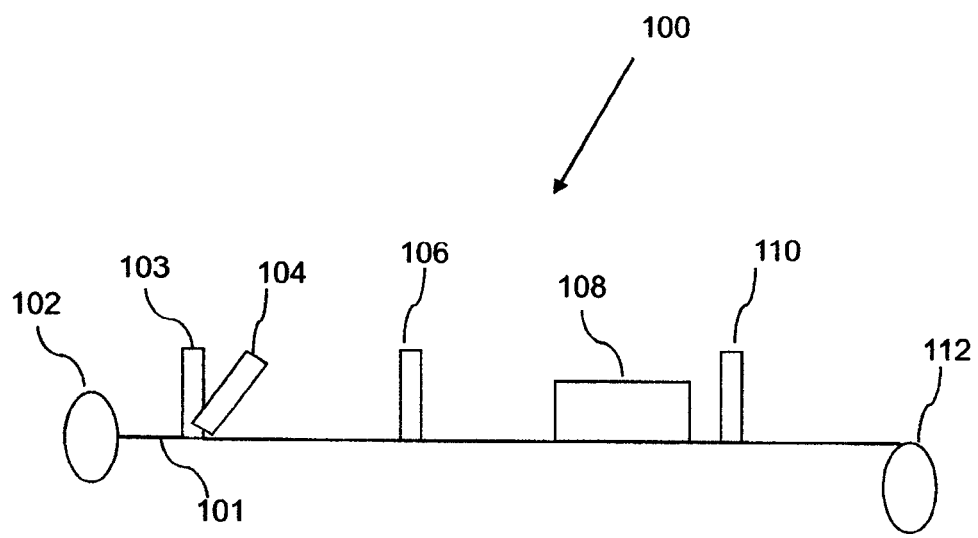
FIG. 1 depicts an overview of manufacturing process for extruding a jacket composition of polymerized silica with nylon in accordance with one embodiment of the present invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It should be understood that any one of the features of the invention may be used separately or in combination with other features. Other systems, methods, features, and advantages of the present invention will be or become apparent to one with skill in the art upon examination of the drawings and the detailed description. It is intended that all such additional systems, methods, features, and advantages be included within this description, be within the scope of the present invention, and be protected by the accompanying claims.

The present disclosure is described below with reference to the Figures in which various embodiments of the present invention are shown. The subject matter of the disclosure may, however, be embodied in many different forms and should not be construed as limited to the exemplary embodiments set forth herein.

The present invention provides for an extrusion method of manufacturing wire and cable having a jacket of polymerized silica with nylon composition to effectively reduce the required pulling force in the installation of wire and cable or other related products. The present invention utilizes commercially available and synthetically produced, amorphous silica that exhibits high porosity and high purity, such as Sylysia by Fuji Silysia Chemical Ltd., and polymerizes the silica with nylon (e.g., Nylon 6 or the like) which is finally pelletized for use in the manufacturing of wire and cable. The resulting extruded, finished wire and/or cable product with a polymerized silica with nylon jacket provides a reduced coefficient of friction such that the required pulling force to install and pull the wire/cable through sections of building walls, ceilings, ducts, and other conduits is also advantageously reduced.

A method of extruding a pre-pelletized composition of polymerized silica, as described above, with nylon into an outer jacket or sheath for electrical wire and cable is disclosed. The method utilizes a predetermined amount of nylon and silica in a polymerized composition in pelletized form, wherein the amount of silica utilized in the composition ranges from about 3% to 6% by weight. Pull tests conducted resulted in a sufficient and measured reduction in the pulling force to comply with or exceed industry requirements. The pull tests were conducted utilizing a 350 KCMIL finished wire product manufactured by the present process and having a minimum of 3% silica polymerized with nylon in an outer jacket or sheath. For example, Table 1 shows an example of the pulling forces exerted over certain time intervals for 350 KCMIL electrical wire. The testing of the cable was performed by pulling three conductors of 350 KCMIL AWG THHN through a 3 inch dry metal conduit configuration using a 120 VAC, 15 amp, 60 Hz 6800 Greenlee Ultra Tugger apparatus rated at 8000 lbs. maximum and 6500 lbs. continuous duty. The wires were pulled through a conduit system with four 90 degree turns. Interval readings from the Greenlee Tugger apparatus show the force required to pull the cable and were recorded every 2 minutes. After approximately 15 minutes, the pull was concluded and individual readings were averaged to produce a final average pulling force required to move the cable. The conduit configuration used in the pull test example was set up as follows:

1.) 4 feet, 6.5 inches vertical run that includes first 90 degree turn.
2.) 67 feet, 2.5 inches horizontal run.
3.) 2 feet, 10 inches horizontal run including the second 90 degree turn.
4.) 19 feet, 3.75 inches horizontal run.
5.) 2 feet, 10 inches horizontal run including the third 90 degree turn.
6.) 67 feet, 2.5 inches horizontal run.
7.) 2 feet, 10 inches vertical drop with fourth and final 90 degree turn.

TABLE 1

| Time of pull in minutes | Pulling Force |
|---|---|
| 2 | 1100 lbs |
| 4 | 1000 lbs |
| 6 | 1000 lbs |
| 8 | 1000 lbs |
| 10 | 1100 lbs |
| 12 | 1200 lbs |
| 15 | 1500 lbs |
|  | Avg. 1128.5 lbs |

Referring to FIG. 1, a diagram is depicted that illustrates a system and method of manufacturing for extruding the pre-pelletized composition of polymerized nylon with silica in accordance with one embodiment of the present invention. In this embodiment, a standard payoff reel 102 to supply an internal conductor(s) 101, such as a copper or aluminum wire is provided in system 100. The standard payoff reel 102 supplies the internal conductor(s) 101 to a first extruder 103 to apply at least an insulating material over the internal conductor(s) 101. First extruder 103 may be a single extruder head, a plurality of extruders, a cross head, a co-extrusion head or any combination thereof. The insulating material may be thermoset, thermoplastic, elastomeric, polymeric dielectric, polyvinylchloride (PVC), or a semiconductor compound or any combination thereof. The first extruder 103, when used as a plurality of extruders, a cross head extruder or a co-extrusion extruder or and combination thereof, can also function to extrude a further additional layer of material after extrusion of the insulating material, such as, but not limited to a composition of polymerized nylon with silica, over the wire or cable to form an outer jacket.

A second extruder 104 can also be utilized in system 100 to apply, as necessary or desired, an additional layer of insulating material over the internal conductor(s) 101 that may similarly comprise a thermoset, thermoplastic, elastomeric, polymeric dielectric, polyvinylchloride (PVC) or a semiconductor compound or any combination thereof. The second extruder 104 can also function in the system 100 to apply a further additional layer, such as, but not limited to the pelletized composition of polymerized nylon with silica, over the wire or cable to form an outer jacket.

A third extruder 106 may also be provided in system 100 to apply a further additional layer of thermoplastic or thermoset material, elastomeric, polymeric dielectric, polyvinylchloride (PVC), or a semiconductor compound or any combination thereof. Alternatively, the third extruder 106 can also be used to extrude a further additional layer, such as, but not limited to the pelletized composition of polymerized nylon with silica over any prior extruded layers or materials. It is contemplated by the present invention that even further additional optional extruders may be provided for additional material application to the wire and cable.

After the insulating material is applied, the insulated wire or cable is supplied to a cooling device 108 for cooling the applied insulating material and the composition of polymerized nylon with silica over the wire or cable. In one embodiment, the cooling device 108 may be a water trough or similar device that contains a cooling material. The cooling device 108 functions to cool and lower the temperature of the insulating material over the wire or cable as it departs extruder 103 and/or second extruder 104 and/or the third extruder 106 and enters the cooling device 108 by removing latent heat caused by extrusion in extruder 103 or the second extruder 104 or the third extruder 106. The cooling of insulating material provides a more stable polymeric state for later processing. In one embodiment, the insulating material is cooled to an ambient temperature, such as a temperature of less than 85 degrees Celsius. After the insulated wire or cable is cooled, the insulated wire or cable is supplied to a spark tester 110, or sparker, for testing. The spark tester 110 generates a high frequency ionization cloud that surrounds the circumference of the insulated wire or cables to detect any imperfection in the insulation.

After the extrusion process, a motor-driven reel 112 is provided to wind up the resulting wire or cable. The resulting wire or cable is reeled by the motor-driven reel 112 and wrapped in plastic film for distribution or storage.

Figure 2:
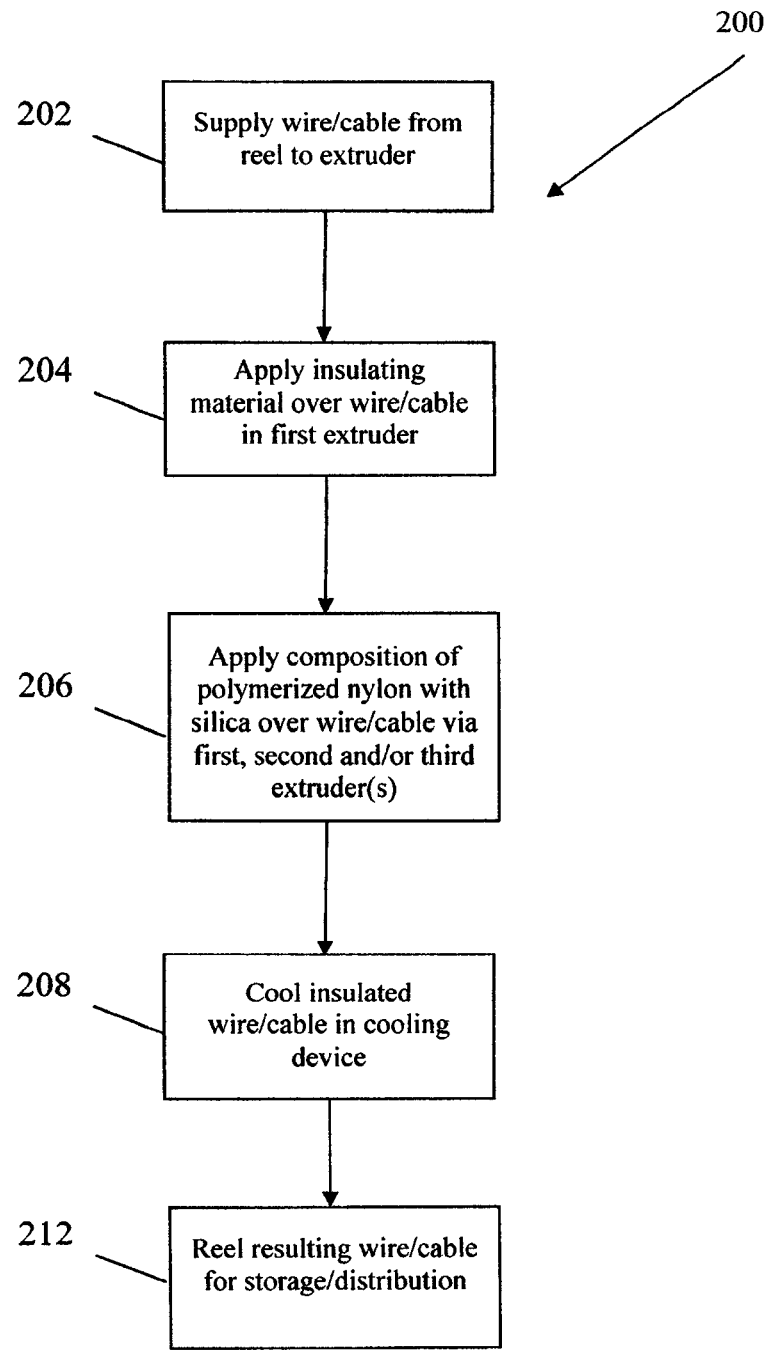
FIG. 2 is a diagram illustrating a manufacturing process for reducing the coefficient of friction in accordance with one embodiment of the present invention.

Referring to FIG. 2, a diagram illustrating a process for reducing the coefficient of friction is depicted in accordance with one embodiment of the present disclosure. Process 200 begins at step 202 to supply a conductor wire or cable from a reel to an extruder. Next, process 200 continues to step 204 to apply an insulating material over the internal conductor of the wire or cable. For example, insulating material such as PVC or PE may be applied over the internal conductor in extruder 104 of FIG. 1. Process 200 then continues to step 206 to apply additional material over the insulated wire or cable in an optional extruder. For example, additional insulating material, such as PVC or PE, may be applied over the insulated wire or cable in the first optional extruder 104 and/or the second optional 106 of FIG. 1, or any combination thereof.

Process 200 then continues to step 208 to cool the insulated wire or cable using a cooling device 108 of FIG. 1. For example, the cooling device 108 may be a water trough that cools the insulating material by removing latent heat caused by extrusion in extruder 104 or optional extruder 106. In one embodiment, the insulating material is cooled to an ambient temperature, such as a temperature of less than 85 degrees Celsius.

What is claimed is:

1. A process for making a finished wire and cable, the process comprising:
   supplying at least one internal conductor wire to at least one extruder;
   providing the at least one extruder, wherein the at least one extruder applies an insulating material and a polymerized jacket composition over the at least one internal conductor wire, wherein the jacket composition comprises:
   a predetermined amount by weight of nylon; and
   at least 3% and less than 5% by weight of a predetermined amount of amorphous silica, wherein the nylon and silica are polymerized together without a pulling lubricant as an extrudable, pelletized compound;
   providing a cooling device for lowering the temperature of the extruded insulating material and the polymerized jacket composition and cooling the insulating material and the polymerized jacket composition in the cooling device.

2. The process of claim 1, wherein the silica is synthetically produced.

3. The process of claim 1, wherein the at least 3% and less than 5% by weight of a predetermined amount of amorphous silica includes a range of 3%-4.5% by weight of amorphous silica.

4. The process of claim 1, wherein the step of providing the least one extruder further comprises:
   providing a first extruder, wherein the first extruder applies an insulating material; and
   providing a second extruder, wherein the second extruder applies the polymerized jacket composition.

5. The process of claim 4, wherein the insulating material is a polyvinylchloride (PVC) material.

6. The process of claim 1, wherein the temperature of the extruded insulating material and the polymerized jacket composition is lowered to a temperature of less than 85 degrees Celsius.

7. A process for making a finished wire and cable with an internal conductor, the process comprising:
   providing an extruder, wherein the extruder applies an insulating material and a jacket composition over the internal conductor, wherein the jacket composition comprises:
   a predetermined amount by weight of nylon; and
   at least 3% and less than 5% by weight of a predetermined amount of amorphous silica, wherein the nylon and silica are polymerized together without a pulling lubricant as an extrudable, pelletized compound.

8. The process of claim 7 further comprising:
   providing a cooling device for lowering the temperature of the extruded insulating material and the jacket composition and cooling the insulating material and the jacket composition in the cooling device.

9. The process of claim 8, wherein the temperature of the extruded insulating material and the polymerized jacket composition is lowered to a temperature of less than 85 degrees Celsius.

10. The process of claim 8 further comprising:
    reeling onto a storage reel the finished, cooled, wire and cable for storage and distribution.

11. The process of claim 7, wherein the silica is synthetically produced.

12. The process of claim 7, wherein the at least 3% and less than 5% by weight of a predetermined amount of amorphous silica includes a range of 3%-4.5% by weight of amorphous silica.

13. The process of claim 7, wherein the insulating material is a polyvinylchloride (PVC) material.

14. A process for making a finished wire and cable, the process comprising:
    providing a payoff reel containing at least one internal conductor wire;
    supplying the at least one internal conductor wire from the reel to first extruder;
    providing the first extruder, wherein the least one extruder applies a first insulating material;
    providing a second extruder, wherein the second extruder applies jacket composition over the at least one internal conductor wire and insulating material, wherein the jacket composition consisting essentially of:
    a predetermined amount by weight of nylon; and at least 3% and less than 5% by weight of a predetermined amount of amorphous silica, wherein the nylon and silica are polymerized together as an extrudable, pelletized compound;

providing a cooling device for lowering the temperature of the extruded insulating material and the polymerized jacket composition and cooling the insulating material and the polymerized jacket composition in the cooling device; and, reeling onto a storage reel the finished, cooled, wire and cable for storage and distribution.

15. The process of claim 14, wherein the silica is synthetically produced.

16. The process of claim 14, wherein the at least 3% and less than 5% by weight of a predetermined amount of amorphous silica includes a range of 3%-4.5% by weight of amorphous silica.

17. The process of claim 14, wherein the predetermined amount by weight of nylon includes predetermined amount by weight of Nylon 6.

18. The process of claim 14, wherein the finished wire and cable includes Thermoplastic High Heat-resistant Nylon coated wire and cable.

19. The process of claim 14 further comprising:

providing a third extruder, wherein the third extruder applies a second insulation material over the first insulation and prior to the application of the jacket composition.

20. The process of claim 19, where the second insulation material is the same insulating material as the first insulating material.

* * * * *